(12) United States Patent
Fiorentino et al.

(10) Patent No.: US 8,515,223 B2
(45) Date of Patent: Aug. 20, 2013

(54) LENS

(75) Inventors: Marco Fiorentino, Mountain View, CA (US); David A. Fattal, Mountain View, CA (US); Sagi Varghese Mathai, Palo Alto, CA (US)

(73) Assignee: Hewlett-Packard Development Company. L.P., Houston, TX (US)

( * ) Notice: Subject to any disclaimer, the term of this patent is extended or adjusted under 35 U.S.C. 154(b) by 285 days.

(21) Appl. No.: 12/847,844

(22) Filed: Jul. 30, 2010

(65) Prior Publication Data

US 2012/0027349 A1 Feb. 2, 2012

(51) Int. Cl.
*G02B 6/34* (2006.01)

(52) U.S. Cl.
USPC .............................................. 385/37; 385/33

(58) Field of Classification Search
USPC .............. 385/33, 37; 359/566–576, 726–736
See application file for complete search history.

(56) References Cited

U.S. PATENT DOCUMENTS

| 2,670,656 | A | | 3/1954 | Braymer |
| 4,554,448 | A | * | 11/1985 | Sillitto ........................... 250/216 |
| 4,835,380 | A | * | 5/1989 | Opheij et al. ................. 250/216 |
| 5,159,495 | A | * | 10/1992 | Hamblen ....................... 359/731 |
| 5,793,538 | A | * | 8/1998 | Cameron et al. .............. 359/731 |
| 6,169,637 | B1 | * | 1/2001 | Tsunashima .................. 359/726 |
| 6,212,153 | B1 | * | 4/2001 | Chen et al. ............... 369/112.12 |
| 6,987,901 | B2 | * | 1/2006 | Frick ............................... 385/23 |

* cited by examiner

*Primary Examiner* — Daniel Petkovsek (57) ABSTRACT

A lens is described which includes a substrate having a first side and an opposite second side. A first guided mode resonance grating is supported by the first side of the substrate and a second guided mode resonance grating is supported by the second side of the substrate. The second guided mode resonance grating can be offset from the first guided mode resonance grating. The second guided mode resonance grating can shape and reflect a wave front of an incident optical beam within the substrate towards the first guided mode resonance grating. The first guided mode resonance grating can redirect the reflected incident optical beam out of the second side of the substrate.

20 Claims, 7 Drawing Sheets

LENS

BACKGROUND

Lenses and lens combinations have been used in a variety of applications and devices for hundreds or even thousands of years. Numerous methods and systems for preparing lenses are known. Some examples include grinding, polishing, etching, and/or solidification of a liquid, such as a molten glass or liquid plastic. Grinding and polishing operations use precise machine or manual control to ensure that a precise desired curvature is obtained.

Grinding and polishing operations are, in general, not suitable for producing very small lenses or lens arrays. Etching methods, and particularly etching methods for lens arrays, can be heavily dependent upon acid resists being applied to a substrate in a desired accurate pattern. Etching methods can also be dependent upon differences or gradients in acid resistance of a substrate or upon carefully controlled compositions having particular etching rates.

The fabrication of small lenses and lens arrays may involve molding or surface tension during the solidification of a material from the liquid state (e.g., the cooling of molten glass) to form a desired lens curvature. Precise control in obtaining the desired lens curvature can be very difficult. When using surface tension to form the desired lens curvature, the lens surface curvature obtainable is generally restricted to the curvature naturally occurring in droplets of the liquid material. When forming small lenses and lens arrays, positioning and retaining a liquid at a precise desired location in a precise desired quantity can be difficult.

BRIEF DESCRIPTION OF THE DRAWINGS

FIG. 3a is a top view of an annular second GMR grating having a void in the center in accordance with an embodiment;

FIG. 3b is a top view of an annular first GMR grating having a smaller diameter than a second GMR grating disposed over the annular second GMR grating of FIG. 3a;

FIG. 3c is a top view of an array of annular grating lenses in accordance with an embodiment;

FIG. 4b is a top view of an elongate first GMR grating having a width less than a width of a second GMR grating and disposed over the elongate second GMR grating of FIG. 4a;

DETAILED DESCRIPTION

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

In describing and claiming the present technology, the following terminology will be used in accordance with the definitions set forth below.

As used herein, the terms "light", "light beam", and "optical beam" are to be broadly interpreted to include any applicable spectral range including but not limited to visible, ultraviolet, and infra-red radiation.

As used herein, "high index contrast" is used to refer to a ratio of the difference between the highest and the lowest refractive index in a device which is approximately 50% or more. This ratio is a measure for the field reflectivity of the high contrast interface under normal illumination. More precisely, the value of this ratio can be of the order of 50% or more.

As used herein, the term "grating" refers to any spaced collection of essentially similar, parallel, elongated elements. The elements may be made from any suitable material, including those described herein. A non-periodic grating refers to elements which are not all spaced at regular or uniform intervals from one another.

As used herein, a "planar non-periodic high index contrast grating" refers to an optical device which is capable of transmitting or reflecting light and which is substantially flat and thin. In some embodiments, the planar non-periodic high index contrast grating may be made from one or more layers of thin film materials.

As used herein, "guided mode resonance" refers to a phenomenon wherein the guided modes of an optical wave can be excited and extracted by the introduction of a phase-matching element such as a diffraction grating. A guided mode resonance grating is a grating capable of causing a shift in a wave front of an optical wave. In some examples, the guided mode resonance grating can include planar or non-planar non-periodic high index contrast gratings.

Manipulating an optical beam width or "spot size" of a beam of light, or focusing the optical beam can be useful in a number of technology areas. For example, a small spot size can be useful in writing data to, and reading data from, an optical disk. The smaller the spot size, the higher the recording density of the optical disk. As another example, when using micro-lens arrays in computing applications a smaller spot size can decrease a footprint of a device incorporating the array or enable a higher density of optical beams and/or lenses in the micro-lens array.

In order to obtain a desired spot size, a beam is often passed through a convex lens with a high numerical aperture ("NA"). The NA of a convex lens can be increased by increasing the radius of curvature of the lens and shortening the focal length. However, incorporating such lenses in optical-based devices may be cost prohibitive because of the difficulty in fabricating very small lenses with large curvatures and because of the precise polishing needed to make the lenses aberration free. In addition, conventional convex and concave lenses may not be compatible with planar integrated circuits.

Focusing grating couplers can also be used to produce a focused beam of light. With a focusing grating coupler, light propagating along an optical waveguide can be projected into free-space outside of the waveguide and focused. A focusing grating coupler can also be used to couple light from free space to a waveguide. Additionally, a coupler can be configured and operated to relay light from free space to free space.

Although in recent years there have been a number of advances in sub-wavelength optical element design and fabrication, designers and manufacturers of optical elements continue to seek enhancements that broaden the possible range of optical element designs and applications.

According to an embodiment, the lens can include a substrate having a first side and an opposite second side. A first guided mode resonance grating is supported by the first side of the substrate and a second guided mode resonance grating is supported by the second side of the substrate. The second guided mode resonance grating can be offset from the first guided mode resonance grating. The second guided mode resonance grating can shape and reflect a wave front of an incident optical beam within the substrate towards the first guided mode resonance grating. The first guided mode resonance grating can redirect the reflected incident optical beam out of the second side of the substrate.

Figure 1A:
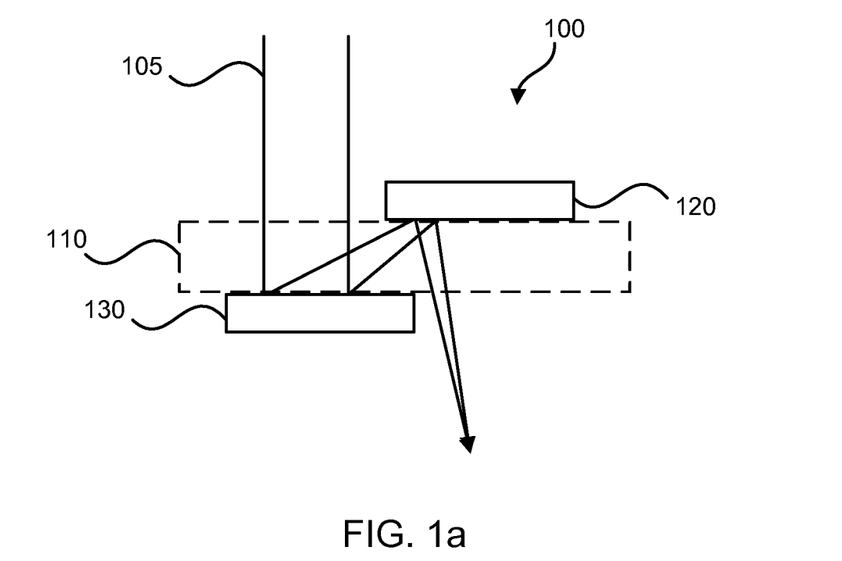
FIG. 1a is a side view of a lens in accordance with an embodiment.

As illustrated in FIG. 1a, a lens, indicated generally at 100, is shown in accordance with an example embodiment. The lens includes a substrate 110. The substrate can be made from glass, silica, plastic, quartz or any other suitable material. The substrate can be substantially transparent, at least to the type of optical beams for which the lens is used. For example, if the optical beam comprises an infrared optical beam, the substrate may comprise a material opaque to light in the visible spectrum and transparent to beams in the infrared spectrum. The substrate can include a first and a second side. The first and second sides can be opposite from one another. In one example, a thickness of the substrate may comprise a thickness of from 200 microns to 1 mm.

A first guided mode resonance grating 120 can be supported by the first side of the substrate 110. The first guided mode resonance (GMR) grating can be positioned adjacent to the substrate or may be partially or wholly embedded within the substrate. A second guided mode resonance grating 130 can also be supported by the substrate. The second GMR grating can be supported by the second or opposite side of the substrate. Additionally, the second GMR grating can be offset from the first guided mode resonance grating. In other words, the first and second GMR gratings are not completely horizontally aligned with one another. FIG. 1a depicts some horizontal overlap of the first and second GMR gratings. However, in other embodiments, the first and second GMR gratings can be offset sufficiently that there is no overlap.

The GMR gratings can be configured to shape and reflect a wave front of an incident optical beam 105. For example, the second GMR grating 130 can shape and reflect a wave front of the incident optical beam towards the first GMR grating 120. The second GMR grating can be positioned on a second side of the substrate 110, or a side of the substrate opposite from a source of the incident optical beam. In other words, the optical beam can pass through at least a portion of the substrate before reaching the second GMR grating. The first GMR grating can redirect the reflected incident optical beam out of the second side or opposite side of the substrate.

The GMR gratings shown in FIG. 1a comprise planar GMR gratings. The GMR gratings of FIG. 1a have been configured to focus the incident optical beam 105 at a point on an opposite side of the substrate from a source of the optical beam. The configuration can cause the incident optical beam to be reflected within the substrate such that the optical beam passes through a width of the substrate between the first and second GMR gratings three times. A wave front of the incident optical beam can be shaped by one or both of the GMR gratings. In an alternate example, only one of the GMR gratings may be configured to shape the wave front and merely reflect the optical beam. A thickness of the GMR gratings may comprise a thickness of from 100 nm to 500 nm. Also, according to embodiments, the first and/or second GMR gratings can be configured to redirect only predetermined wavelengths of the incident optical beam out of the lens. Wavelengths other than those predetermined wavelengths may be transmitted, absorbed, or reflected in a different direction than the desired wavelength.

Figure 1B:
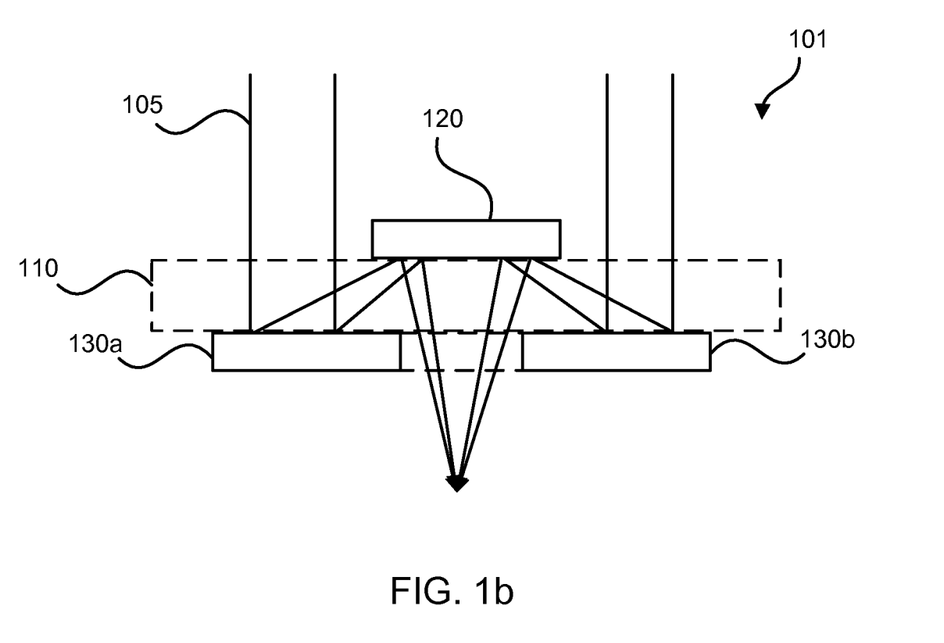
FIG. 1b is a side view of a lens including a second guided mode resonance (GMR) grating on either side of a first GMR grating in accordance with an embodiment.

The lens of FIG. 1b comprises a GMR grating 130a-b offset on either side of another GMR grating 120. The second GMR grating 130a-b may comprise multiple GMR gratings or a single GMR grating at least partially surrounding the first GMR grating 120. Examples of such configurations will be described in further detail below. Using the configuration of FIG. 1b, an incident optical beam 105 can be passed through the lens which has a wider diameter than may be manipulated by the lens 100 of FIG. 1a. Alternatively, the lens 101 of FIG. 1b can enable manipulation of optical beams from a plurality of different sources.

The lens of FIG. 1b may comprise a Cassegrain reflector or be used in a Cassegrain telescope. In other words, the second GMR grating may comprise a grating which provides function equivalent to a parabolic primary mirror and the first GMR grating may provide function equivalent to a hyperbolic secondary mirror that reflects the light back down through a hole in the primary mirror. Folding the optics makes the configuration a compact design. Common applications of Cassegrain reflectors include telescopes, camera lenses, and the like. The Cassegrain reflector can make use of the properties of parabolic and hyperbolic reflectors. For example, a parabolic reflecting GMR grating can reflect incoming light rays parallel to an axis of symmetry to a single point or the focus. A hyperbolic reflecting GMR grating can have two foci and reflect all light rays directed at one of the two foci towards the other of the two focii. The GMR gratings in a telescope or reflector configuration can be designed and positioned to share one focus. The GMR gratings can be configured so that the second focus of the hyperbolic grating may be at a same point at which the image is to be observed, usually just outside an eyepiece. The grating functioning as a parabolic mirror can reflect parallel optical rays entering the telescope to the focus, which is also the focus of the hyperbolic grating. The grating functioning as a hyperbolic mirror can then reflect those light rays to the other focus, where the image may be observed.

A lens as described herein can be used in a number of applications and which can be easier and cheaper to manufacture than previous lenses. The lens described herein can be used in place of many current optical elements but at a lower cost and with a smaller footprint. Some exemplary uses of the lens include, but are not limited to a microscope objective, a lens for an optical storage medium, a telescope, an optical interconnect, a micro-lens array, and any number of other applications for computing, electronics and other fields.

Figures 2A, 2B:
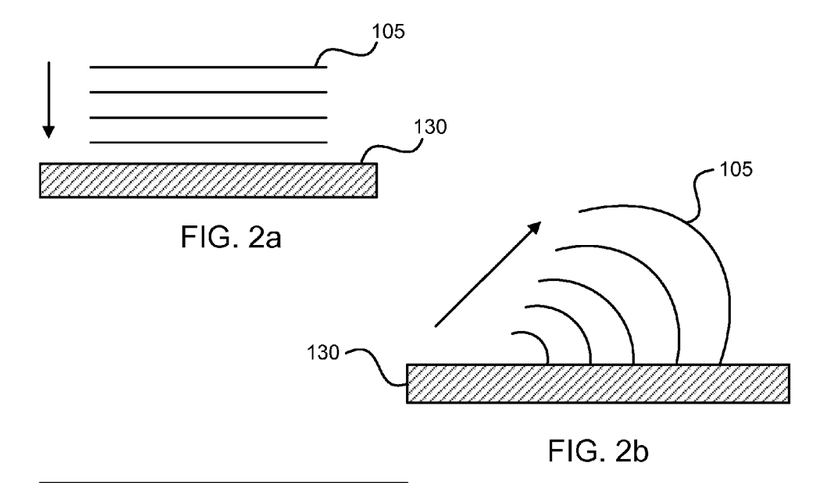
FIGS. 2a-2e illustrate shaping a wavefront using GMR gratings in accordance with embodiments.
Figure 2C:
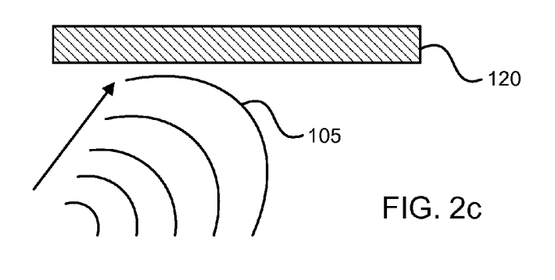
Figure 2D:
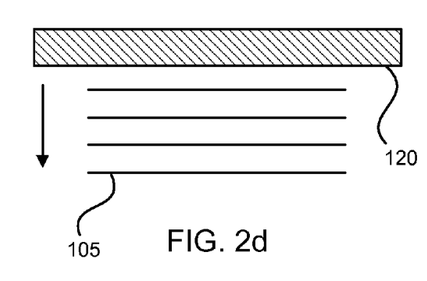
Figure 2E:
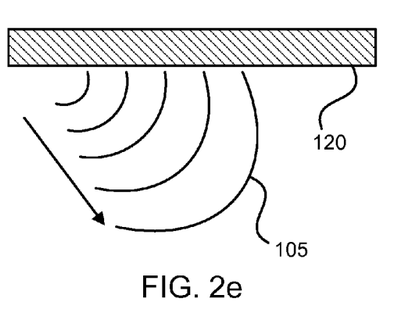

FIGS. 2a-2e illustrate potential wave front shaping configurations of the first and second GMR gratings. Other configurations are also possible and are considered to be within the scope of this disclosure. Referring to FIG. 2a, collimated optical beams 105 are incident upon the second GMR grating 130. As shown in FIG. 2b, the second planar GMR grating can be configured to shape and reflect the wave front. In this instance, the wave front is shaped and reflected to be directed toward the first GMR grating. The degree and direction of shaping and reflection can vary depending upon a desired configuration. FIG. 2c illustrates the shaped wave front being directed toward the first GMR grating 120. FIG. 2d illustrates an example where the first GMR grating is configured to shape and reflect the optical beam as collimated light. FIG. 2e illustrates an alternate example to FIG. 2d where the first GMR grating is configured to shape and reflect the optical beam in another direction. For example, as described above regarding FIGS. 1a-1b, the first GMR grating can be configured to focus the incident optical beam.

Figures 3A, 3B, 3C:
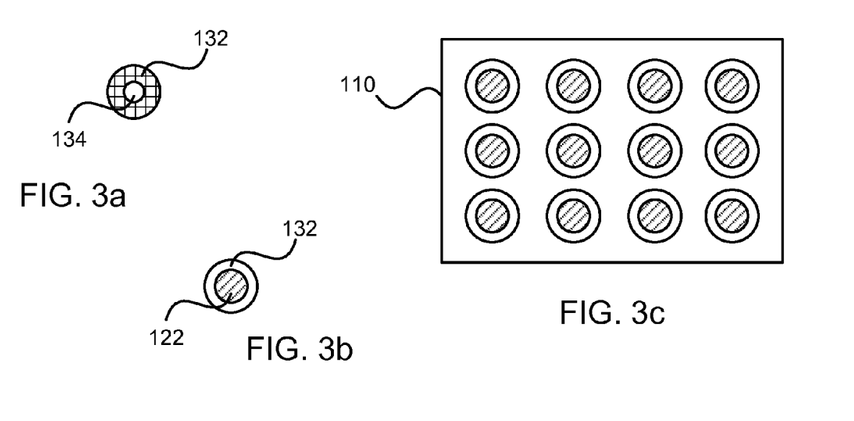

Referring to FIG. 3a, a top view of a second GMR grating 132 is shown in accordance with an embodiment. In this example, the second GMR grating comprises a ring or annular shape. The second GMR grating can further comprise a void 134 within the annular shape. In the example illustrated, the void comprises an annular shape centered within the GMR grating. The second GMR grating or the void may comprise any other desired shape as well. For example, the GMR grating and/or void may comprise a polygonal shape. The void can be centered within the second GMR grating or offset from the center.

In this example, the void is present to allow an optical beam reflected from the first GMR grating to pass through the center of the second GMR grating. FIG. 3b illustrates a top view of a first GMR grating 122 positioned over the second GMR grating 132 of FIG. 3a. In this example, the first GMR grating comprises a larger diameter annular grating than the void 134. However, the first GMR grating may also comprise a same or smaller diameter than the void. Also, the first GMR grating may comprise a different shape than the void and/or the second GMR grating. In this example, the second GMR grating substantially surrounds the first GMR grating as projected through to the second side of the substrate. In other words, the first GMR grating is supported by the first side of the substrate and projecting the edges of the first GMR grating through to the second side of the substrate results in a projection which is circumferentially surrounded by the edges of the second GMR grating. The first GMR grating can be configured to redirect a reflected incident optical beam out through the void on the second side of the substrate.

FIG. 3c illustrates a micro-lens array comprising a plurality of the first and second GMR gratings of FIG. 3b. A substrate 110 is positioned at least partially between each of the first and second GMR gratings.

The void within the second GMR grating as described herein may comprise free space without any materials therein or may alternately comprise a void in the grating which is at least partially filled with another material. For example, a clear or optically transparent fill material may at least partially fill the void. In another example, the substrate 110 can at least partially fill the void or extend at least partially into the void.

Figure 4A:
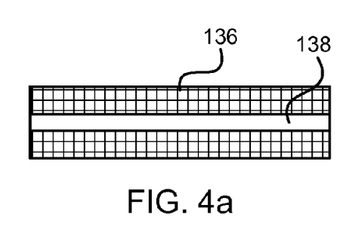
FIG. 4a is a top view of an elongate second GMR grating having an elongate void in the center thereof, in accordance with an embodiment.

Referring to FIG. 4a, a top view of a second GMR grating 136 is shown in accordance with an embodiment. In this example, the second GMR grating comprises an elongated rectangular or linear shape. The second GMR grating can further comprise a void 138 within the rectangular shape. In the example illustrated, the void comprises a rectangular shape centered within the GMR grating and extending along an entire length of the grating. Because the void extends along an entire length of the grating, the second GMR grating comprises a plurality of second GMR gratings. As with the examples described above regarding FIGS. 3a-3c, the shapes and configurations of the second GMR grating and the void may comprise a variety of shapes and configurations other than those shown. Furthermore, the void may not extend along an entire length of the second GMR grating and the second GMR grating may comprise a single GMR grating.

Figure 4B:
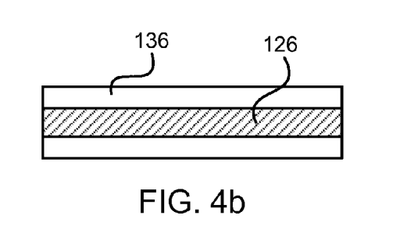
Figure 4C:
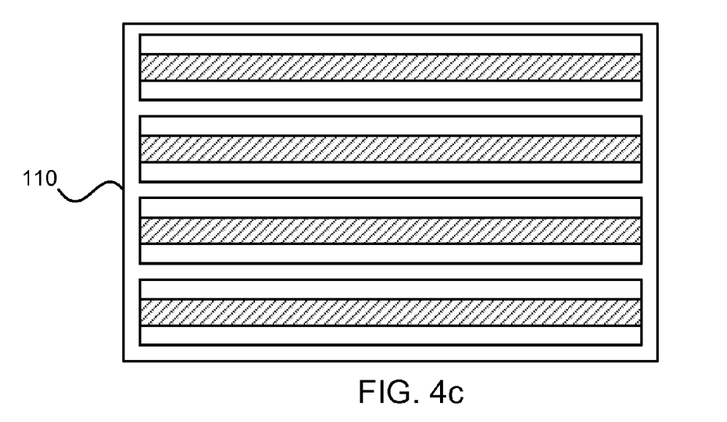
FIG. 4c is a top view of an array of elongate grating lenses in accordance with an embodiment.

Referring to FIG. 4b, a top view is illustrated of a first GMR grating 126 positioned over the second GMR grating of FIG. 4a. In this example, the first GMR grating comprises a larger width grating than the void 138. However, the first GMR grating may also comprise a same or smaller width than the void. Also, the first GMR grating is shown as having a same length as the void. However, the first GMR grating may also comprise a lesser or greater length than the void. FIG. 4c illustrates a micro-lens array comprising a plurality of the first and second GMR gratings of FIG. 4b. A substrate 110 is positioned at least partially between each of the first and second GMR gratings.

Figure 5:
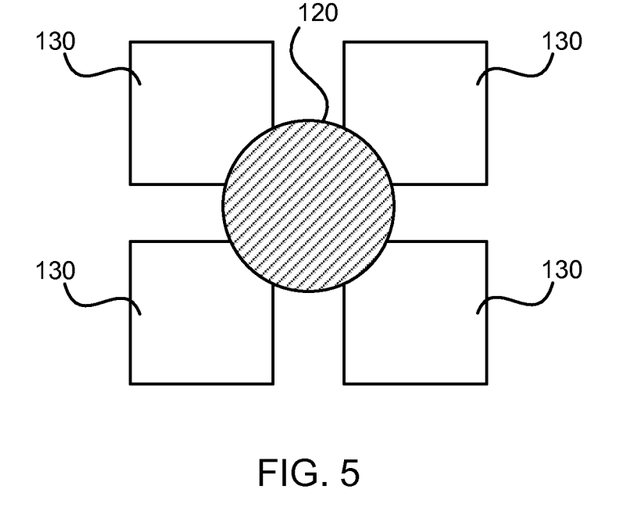
FIG. 5 is a top view of a collection of first and second GMR gratings forming a lens in accordance with an embodiment.

Referring to FIG. 5, a lens configuration is shown which includes four second GMR gratings 130 and a single centrally located first GMR grating 120. This example, in combination with the foregoing examples, illustrates how a variety of different shapes, configurations, and numbers of GMR gratings may be used in combination to achieve a desired configuration.

Figure 6:
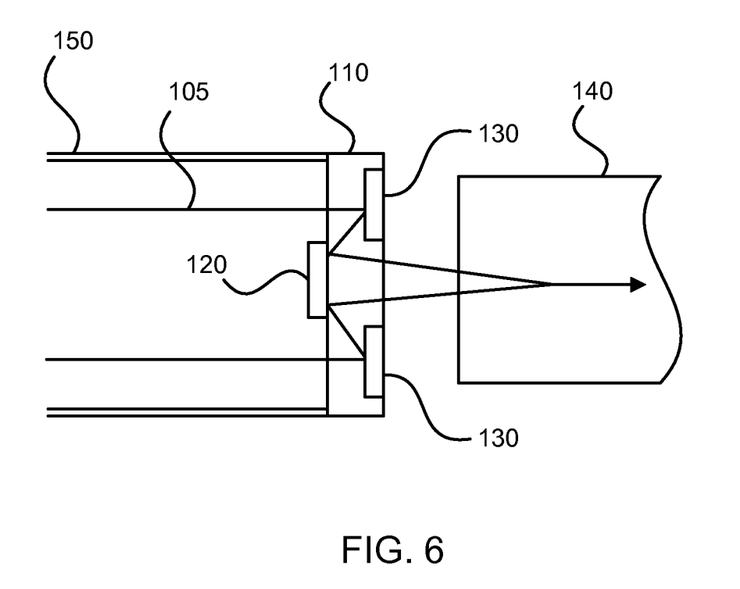
FIG. 6 is a cross-sectional side view of GMR gratings used as an optical interconnect for coupling a waveguide to an optical fiber, and including a grating inset into a substrate, in accordance with an embodiment.

Referring to FIG. 6, a lens is shown which is similar in many regards to those described above. In the lens of FIG. 6, a first GMR grating 120 is positioned adjacent an outer edge of the substrate 110. A second GMR grating 130 is at least partially embedded within an opposite side of the substrate. Alternate configurations include partial or complete embedding of both GMR gratings within the substrate or at least partial embedding or insetting of the first GMR grating within the substrate instead of the second GMR grating. The lens of FIG. 6 comprises an optical interconnect for connecting a hollow-metal waveguide 150 with an optical fiber 140.

Figure 7A:
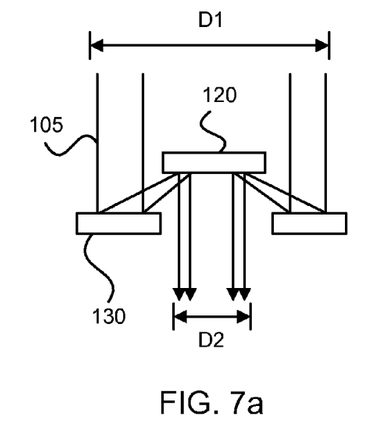
FIG. 7a is a side view of GMR gratings for use in providing a narrow collimated output beam from a wider collimated input beam in accordance with an embodiment.
Figure 7B:
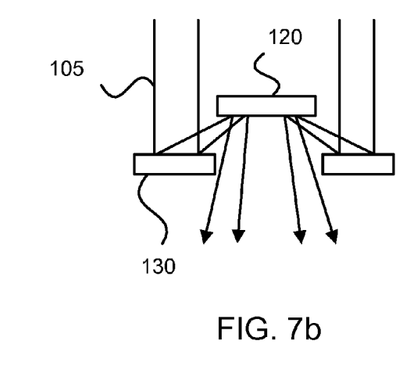
FIG. 7b is a side view of GMR gratings for use in providing a diverging output optical beam from a collimated input optical beam in accordance with an embodiment.

Referring to FIG. 7a, an example is shown where a collimated optical beam 105 comprises a first diameter D1 prior to incidence upon the lens. The first and second GMR gratings 120, 130 can reflect and shape the optical beam such that the output beam also comprises a collimated optical beam. The lens configuration can be such that the output beam comprises a second diameter D2 less than the first diameter. In some applications, an input optical beam may comprise too large of a diameter, and a configuration such as the one shown in FIG. 7a may be desirable. Referring to FIG. 7b, a configuration is shown where the first and second GMR gratings are configured to output a diverging optical beam from a collimated input optical beam. Other configurations include using a diverging input optical beam or a converging input optical beam.

Figure 8A:
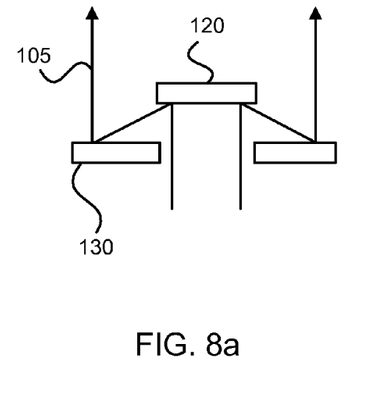
FIGS. 8a-8b illustrate bi-directionality of the lens with GMR gratings in accordance with embodiments.
Figure 8B:
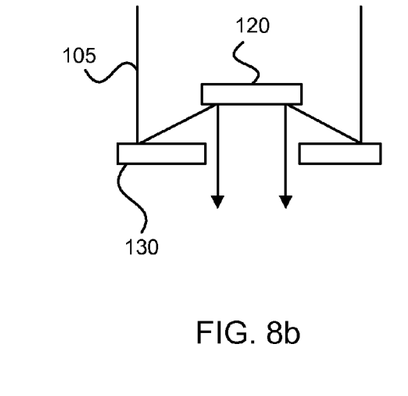

FIGS. 8a-8b illustrate the bi-directionality of the GMR gratings used in the lenses described herein. For example, an incident optical beam 105 can come from either side of the lens and the lens can be configured to provide a desired operation. While FIG. 8b illustrates an operation on the incident optical beam similar to the operation described above regarding FIG. 7a, FIG. 8a illustrates widening a diameter or beam spot of an input optical beam to provide a wider diameter collimated output optical beam.

Figure 9A:
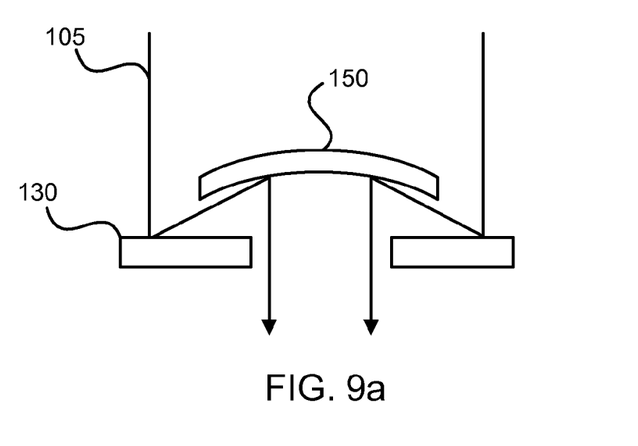
FIGS. 9a-9c are side views of lens configurations including planar and non-planar GMR gratings in accordance with embodiments.
Figure 9B:
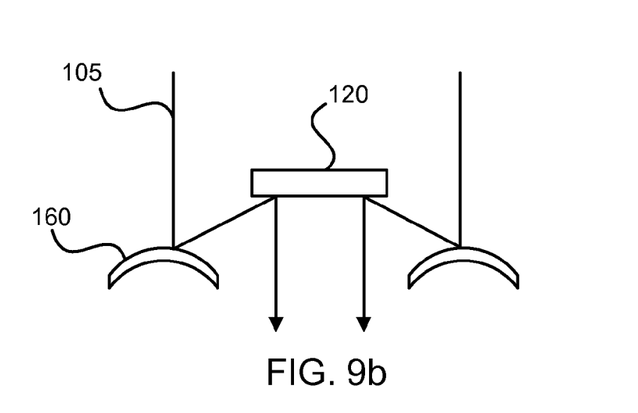
Figure 9C:
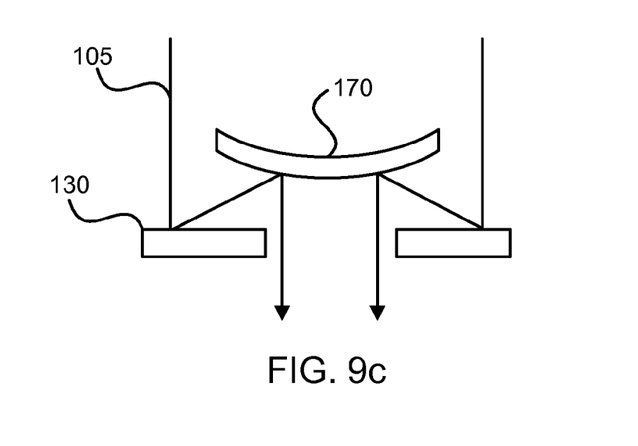

Reference will now be made to FIGS. 9a-9c. The foregoing examples have described the GMR gratings and/or the substrate as planar. However one or more of the GMR gratings and/or the substrate may alternately comprise a non-planar shape. FIGS. 9a-9c illustrate various configurations where planar GMR gratings have been replaced with non-planar GMR gratings. FIG. 9a shows an example where the second GMR grating 130 comprises a planar configuration, while the first GMR grating 150 comprises a concave surface. Though the first GMR grating is illustrated as including two equally curved sides (e.g., the top and bottom of the first GMR grating), the curvature need not be the same on both sides of the grating. In one example, at least one of the first and second GMR gratings can be curved due to a curvature of the substrate upon which the GMR gratings are formed. FIG. 9b illustrates an example where the second GMR grating(s) comprises a convex curvature. FIG. 9c illustrates a configuration where the first GMR grating comprises a convex curvature. Though each of the examples of FIGS. 9a-9c illustrate collimated input and output optical beams, the input or output optical beams may also comprise convergent or divergent optical beams.

The GMR gratings may comprise planar non-periodic high-index-contrast gratings, such as are also more fully described and shown in co-pending U.S. Patent Application Serial No. PCT/US2009/051026 entitled NON-PERIODIC GRATING REFLECTORS WITH FOCUSING POWER AND METHODS FOR FABRICATING THE SAME filed on Jul. 17, 2009 and U.S. Patent Application Serial No. PCT/US2009/058006 entitled OPTICAL DEVICES BASED ON DIFFRACTION GRATINGS filed on Sep. 23, 2009, both of which are incorporated by reference in their entirety herein.

Non-periodic grating reflectors for use as the above-mentioned reflectors will now be described. Embodiments of the present disclosure are directed to planar sub-wavelength dielectric gratings ("SWGs") that can be configured to operate as mirrors and other reflective optical devices. The SWGs can be composed of two layers. The grating layer can be disposed on the surface of a substrate with the grating layer composed of a relatively higher refractive index material than the substrate or the grating layer can simply be fabricated in a suspended membrane without a substrate. SWGs configured in accordance with embodiments of the present disclosure provide new functionalities including phase front control. This can be accomplished by configuring the grating layer with a grating pattern to control phase changes in the light reflected from the SWG without substantially affecting the high reflectivity of the SWG. In certain embodiments, the grating layer can be configured so that the SWG can be operated as any type of optical device with an arbitrary reflecting surface. In particular, the grating layer of a SWG can be configured with a grating pattern enabling the SWG to be operated with characteristics similar to a parabolic or hyperbolic mirror. Embodiments of the present disclosure can also include methods and design rules for patterning the grating layer to generate a particular phase change across the mirror for the reflected beam using conventional lithography and etching techniques.

In one example, the grating patterns may be composed of a number of one- or two-dimensional grating sub-patterns. For example, each grating sub-pattern may comprise a number of regularly spaced wire-like "lines" having a thickness. The lines can extend in a y-direction and be periodically spaced in the x-direction. In one aspect, the GMR gratings may be composed of lines disposed on a surface of a substrate, where the lines are composed of a relatively higher refractive index material than the substrate. As an example, the lines can be composed of silicon ("Si") and the substrate can be composed of quartz or silicon dioxide ("$SiO_2$"), or the lines can be composed of gallium arsenide ("GaAs") and the substrate can be composed of aluminum gallium arsenide ("AlGaAs") or aluminum oxide ("$Al_2O_3$"), or the lines can be composed of gallium nitride ("GaN") and the substrate can be composed of sapphire or $Al_2O_3$. In other embodiments, the GMR gratings can be a single membrane with lines separated by grooves formed in the membrane. The single membrane can be composed of any suitable material, such as Si, GaAs, GaN, or indium phosphide ("InP").

The lenses can be fabricated using conventional deposition and lithographic techniques. For example, the lenses described above can be fabricated by depositing a semiconductor or metal layer on the front and back surfaces of a silicon dioxide ("$SiO_2$") substrate using chemical vapor deposition ("CVD") or physical vapor deposition (PVD). Next, a polymer resist can be deposited over the front surface using spin coating. Next, the semiconductor or metal layer on the front surface is configured to operate as the first grating layer using reactive ion etching, focusing ion beam milling, nanoimprint lithography, e-beam lithography, photolithography, or any other suitable technique for forming grooves separating lines in the grating layer. Then, the polymer resist is removed and a second polymer resist is spin coated on the back surface. Next, the semiconductor or metal layer on the back surface is configured to operate as the second grating layer using reactive ion etching, focusing ion beam milling, nanoimprint lithography, e-beam lithography, photolithography, or any other suitable technique for forming grooves separating lines in the grating layer.

In certain embodiments, multiple gratings may be formed on the front or back surfaces of the substrate by depositing a silicon dioxide layer over the existing grating layer using CVD followed by a planarization process, such as chemical mechanical polishing, to remove surface topography. Then, a semiconductor or metal layer is deposited using CVD or PVD, and a second grating layer may be patterned using spin coated polymer resist and the techniques mentioned above. In certain embodiments, the silicon dioxide layer can be removed by a solvent such as hydrofluoric acid (HF) followed by critical point drying, or by using vapor HF.

A method for manufacturing a lens is provided in accordance with an embodiment. The method can include providing a substrate having a first side and an opposite second side. A first GMR grating can be affixed to the first side of the substrate. As used herein, "affix" can refer to attachment, but can also include formation of the grating on or within the substrate. A second GMR grating can be affixed to the second side of the substrate. The second GMR grating can be offset from the first GMR grating and be configured to shape and reflect a wave front of incident optical beam within the substrate towards the GMR grating.

In one aspect of the method, affixing the first GMR grating to the first side of the substrate comprises insetting the first GMR grating into the first side of the substrate. Also, affixing the second GMR grating to the second side of the substrate and offset from the first GMR grating may comprise insetting the second GMR grating into the second side of the substrate. In another aspect, affixing the first and second guided mode resonance grating may comprise affixing an array of first and second guided mode resonance gratings to a single substrate, wherein each of the first and second GMR gratings in the array comprises a thickness of less than $\frac{1}{400}^{th}$ of a thickness of the single substrate.

A method for directing an optical beam is also provided in accordance with an embodiment. The method can include receiving an incident optical beam at a first GMR grating. A wave front of the incident optical beam can be shaped with the first GMR grating. The incident optical beam can also be reflected with the first GMR grating to form a reflected optical beam. The reflected optical beam can be received at a second GMR grating. The reflected optical beam can then be redirected with the second GMR grating to form an output optical beam. The method can also include shaping a wave front of the reflected optical beam with the second GMR grating.

Figure 10:
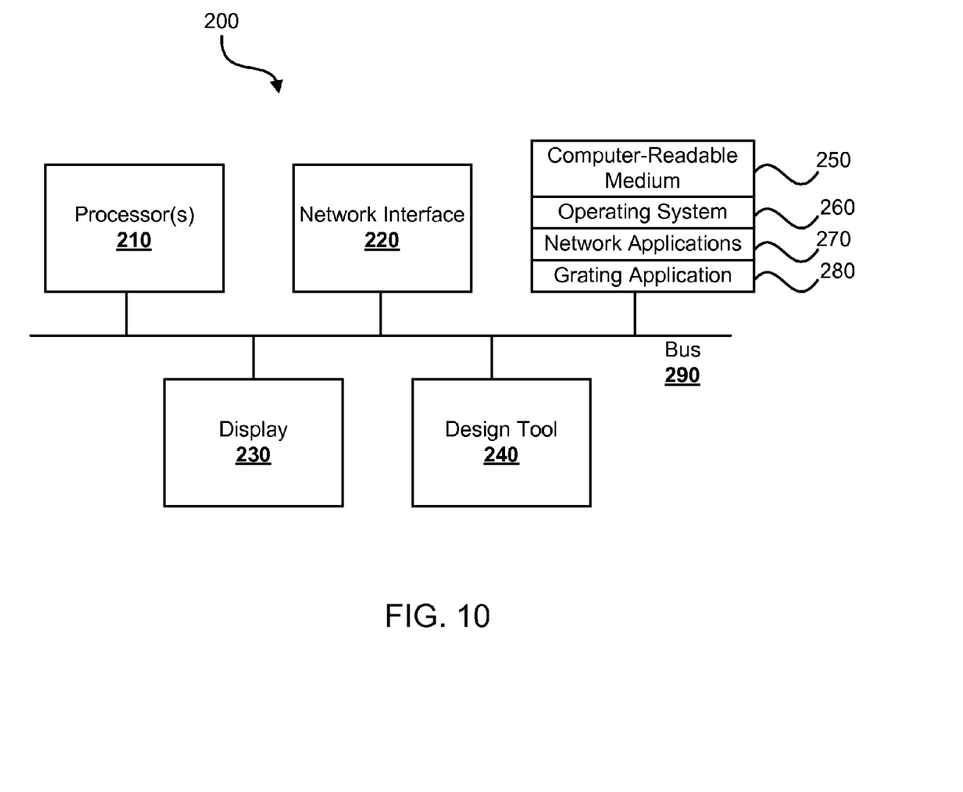
FIG. 10 is a block diagram of a computing system for forming GMR gratings and GMR grating arrays in accordance with an embodiment.

In general, methods employed to generate grating pattern data for a GMR grating can be implemented on a computing device, such as a desktop computer or a laptop. FIG. 10 shows a schematic representation of a computing device 200 configured in accordance with embodiments of the present disclosure. The device 200 includes one or more processors 210, such as a central processing unit; one or more display devices 230, such as a monitor; a design tool interface 240; one or more network interfaces 220, such as a Local Area Network LAN, a wireless 802.11x LAN, 3G mobile WAN or a WiMax WAN; and one or more computer-readable mediums 250. Each of these components is operatively coupled to one or more buses 290. For example, the bus can be an EISA, a PCI, a USB, a FireWire, a NuBus, or a PDS.

The computer readable medium 250 can be any suitable medium that participates in providing instructions to the processor 210 for execution. For example, the computer readable medium can be non-volatile media, such as an optical disk, a magnetic disk, or a magnetic disk drive; volatile media, such as memory; and transmission media, such as coaxial cables, copper wire, and fiber optics. The computer readable medium can also store other software applications, including word processors, browsers, email, Instant Messaging, media players, and telephony software.

The computer-readable medium 250 may also store an operating system 260, such as Mac OS, MS Windows, Unix, or Linux; network applications 270; and a grating application 280. The operating system can be multi-user, multiprocessing, multitasking, multithreading, real-time and the like. The operating system can also perform basic tasks such as recognizing input from input devices, such as a keyboard or a keypad; sending output to the display 230 and the design tool 240; keeping track of files and directories on medium 250; controlling peripheral devices, such as disk drives, printers, image capture device; and managing traffic on the one or more buses 290. The network applications includes various components for establishing and maintaining network connections, such as software for implementing communication protocols including TCP/IP, HTTP, Ethernet, USB, and FireWire. The grating application provides various software components for generating grating pattern data. In certain embodiments, some or all of the processes performed by the grating application can be integrated into the operating system. In certain embodiments, the processes can be at least partially implemented in digital electronic circuitry, or in computer hardware, firmware, software, or in any combination thereof.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A lens, comprising:
a substrate comprising a first side and an opposite second side;
a first guided mode resonance grating supported by the first side of the substrate, wherein the first guided mode resonance grating comprises a plurality of spaced apart elongated elements, wherein each element of the first guided mode resonance has a substantially flat surface that extends along a first common plane;
a second guided mode resonance grating supported by the second side of the substrate and offset from the first guided mode resonance grating, the second guided mode resonance grating being configured to shape and reflect a wave front of an incident optical beam within the substrate towards the first guided mode resonance grating, wherein the second guided mode resonance grating comprises a plurality of spaced apart elongated elements, wherein each element of the second guided mode resonance has a substantially flat surface that extends along a second common plane; and
wherein the first guided mode resonance grating is configured to redirect the reflected incident optical beam out of the second side of the substrate.

2. A lens according to claim 1, wherein the second guided mode resonance grating comprises a plurality of gratings offset on either side of the first guided mode resonance grating, and wherein the first guided mode resonance grating is configured to redirect the reflected incident optical beam out of the second side of the substrate between the plurality of gratings.

3. A lens according to claim 1, wherein the second guided mode resonance grating comprises a ring shape.

4. A lens according to claim 3, wherein the ring shape comprises a void in a center of the ring shape and the second guided mode resonance grating substantially surrounding the first guided mode resonance grating as projected to the second side of the substrate, and wherein the first guided mode resonance grating is configured to redirect the reflected incident optical beam out of the void on the second side of the substrate.

5. A lens according to claim 1, wherein the lens forms a Cassegrain telescope.

6. A lens according to claim 1, wherein the lens forms a converging lens and the incident optical beam comprises a collimated optical beam, the lens being configured to focus the collimated optical beam.

7. A lens according to claim 1, wherein the substrate comprises glass or silica having a thickness of from 200 microns to 1 mm.

8. A lens according to claim 1, wherein a thickness of the first guided mode resonance grating comprises a thickness of from 100 nm to 500 nm.

9. A lens according to claim 1, wherein a plurality of the lenses comprise a micro-lens array.

10. A lens according to claim 1, wherein the lens comprises an optical interconnect for connecting a hollow-metal waveguide with an optical fiber.

11. A lens according to claim 1, wherein the first guided mode resonance grating is configured to redirect only predetermined wavelengths of the incident optical beam out of the second side of the substrate.

12. A lens according to claim 1, wherein:
the incident optical beam comprises a collimated input optical beam comprising a first dimension;

the reflected incident optical beam redirected out of the second side of the substrate comprises a collimated output optical beam comprising a second dimension; and the first and second guided mode resonance gratings are configured to receive the collimated input optical beam and output the collimated output optical beam such that the second dimension comprises a smaller dimension than the first dimension.

13. A lens according to claim 1, wherein the second guided mode resonance grating comprises a plurality of elongated gratings on either side of the first guided mode resonance grating, and wherein the first guided mode resonance grating comprises an elongated grating extending between the plurality of elongated gratings of the second flat guided mode resonance grating.

14. A lens according to claim 1, wherein the substrate is a geometric prism.

15. A method for manufacturing a lens, comprising:
providing a substrate comprising a first side and an opposite second side;
affixing a first guided mode resonance grating to the first side of the substrate, wherein the first guided mode resonance grating comprises a plurality of spaced apart elongated elements, wherein each element of the first guided mode resonance has a substantially flat surface that extends along a first common plane; and
affixing a second guided mode resonance grating to the second side of the substrate, the second guided mode resonance grating being offset from the first guided mode resonance grating and configured to shape and reflect a wave front of incident optical beam within the substrate towards the first guided mode resonance grating, wherein the second guided mode resonance grating comprises a plurality of spaced apart elongated elements, wherein each element of the second guided mode resonance has a substantially flat surface that extends along a second common plane.

16. A method in accordance with claim 15, wherein affixing the first guided mode resonance grating to the first side of the substrate comprises insetting the first guided mode resonance grating into the first side of the substrate, and wherein affixing the second guided mode resonance grating to the second side of the substrate and offset from the first guided mode resonance grating comprises insetting the second guided mode resonance grating into the second side of the substrate.

17. A method in accordance with claim 15, wherein affixing the first and second guided mode resonance grating comprising affixing the elongated elements of the first and second guided mode resonance gratings to a single substrate, and wherein the elongated elements of the first and second guided mode resonance gratings have a thickness of less than $1/400^{th}$ of a thickness of the single substrate.

18. A method in accordance with claim 15, wherein affixing the second guided mode resonance grating to the second side of the substrate comprises affixing the plurality of elongated elements of the second guided mode resonance grating to the second side of the substrate.

19. A method for directing an optical beam, comprising:
receiving an incident optical beam at a first guided mode resonance grating;
shaping a wave front of the incident optical beam with the first guided mode resonance grating, wherein the first guided mode resonance grating comprises a plurality of spaced apart elongated elements, wherein each element of the first guided mode resonance has a substantially flat surface that extends along a first common plane;
reflecting the incident optical beam with the first guided mode resonance grating to form a reflected optical beam;
receiving the reflected optical beam at a second guided mode resonance grating, wherein the second guided mode resonance grating comprises a plurality of spaced apart elongated elements, wherein each element of the second guided mode resonance has a substantially flat surface that extends along a second common plane; and
redirecting the reflected optical beam with the second guided mode resonance grating to form an output optical beam.

20. A method according to claim 19, further comprising shaping a wave front of the reflected optical beam with the second guided mode resonance grating.

* * * * *

UNITED STATES PATENT AND TRADEMARK OFFICE
CERTIFICATE OF CORRECTION

PATENT NO. : 8,515,223 B2  
APPLICATION NO. : 12/847844  
DATED : August 20, 2013  
INVENTOR(S) : Marco Fiorentino et al.

Page 1 of 1

It is certified that error appears in the above-identified patent and that said Letters Patent is hereby corrected as shown below:

On the title page, item (73), Assignee, in column 1, line 2, delete "Company." and insert -- Company, --, therefor.

In the Claims

In column 11, line 14, in Claim 13, delete "second flat" and insert -- second --, therefor.

Signed and Sealed this  
Twenty-fourth Day of December, 2013

Margaret A. Focarino  
*Commissioner for Patents of the United States Patent and Trademark Office*